(12) United States Patent
Igarashi et al.

(10) Patent No.: US 11,652,554 B2
(45) Date of Patent: May 16, 2023

(54) OPTICAL RECEIVING APPARATUS, OPTICAL TRANSMISSION SYSTEM, OPTICAL TRANSMISSION METHOD AND COMPUTER PROGRAM

(71) Applicant: NIPPON TELEGRAPH AND TELEPHONE CORPORATION, Tokyo (JP)

(72) Inventors: Ryo Igarashi, Musashino (JP); Takuya Kanai, Musashino (JP); Masamichi Fujiwara, Musashino (JP); Junichi Kani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/623,968

(22) PCT Filed: Jul. 1, 2019

(86) PCT No.: PCT/JP2019/026030
§ 371 (c)(1),
(2) Date: Dec. 30, 2021

(87) PCT Pub. No.: WO2021/001868
PCT Pub. Date: Jan. 7, 2021

(65) Prior Publication Data
US 2022/0368428 A1    Nov. 17, 2022

(51) Int. Cl.
*H04B 10/00*    (2013.01)
*H04B 10/67*    (2013.01)
(Continued)

(52) U.S. Cl.
CPC ........... *H04B 10/67* (2013.01); *H04B 10/614* (2013.01)

(58) Field of Classification Search
CPC .......... H04Q 11/0001; H04Q 11/0015; H04Q 11/0016
See application file for complete search history.

(56) References Cited

U.S. PATENT DOCUMENTS

| 2004/0161234 | A1 | 8/2004 | Ozawa | |
|---|---|---|---|---|
| 2019/0379453 | A1* | 12/2019 | Toda | H04B 10/07955 |
| 2020/0213011 | A1* | 7/2020 | Tanaka | H04B 10/0779 |

FOREIGN PATENT DOCUMENTS

| JP | 2004247780 A | 9/2004 |
|---|---|---|
| JP | 2013255086 A | 12/2013 |

(Continued)

OTHER PUBLICATIONS

F. Saliou et al., ECOC2010, "Single SOA to Extend Simultaneously the Optical Budget of Coexisting G-PON and 10G-PON", Sep. 19, 2010.

(Continued)

*Primary Examiner* — Daniel G Dobson

(57) ABSTRACT

An optical reception device including: a wavelength selection unit configured to split an optical signal amplified by an optical amplifier into different paths according to wavelengths by using a wavelength multiplexer/demultiplexer, and control a passage state of a passage target optical switch through which the optical signal is to be passed, out of a plurality of optical switches provided on the respective paths, to select an optical signal of a path where the optical signal entered and output the optical signal to a receiver; and a wavelength detection unit configured to detect the wavelength of an optical signal by using each of a plurality of optical detectors, determine the passage target optical switch based on a detection result, and output, to the determined passage target optical switch, a control signal for controlling the passage target optical switch so as to enter the passage state, the optical detectors being respectively provided on (Continued)

different paths that are different from the paths on which the plurality of optical switches are provided and that respectively correspond to wavelengths into which the optical signal is split by a wavelength multiplexer/demultiplexer.

7 Claims, 10 Drawing Sheets

(51) Int. Cl.
*H04B 10/61* (2013.01)
*H04J 14/00* (2006.01)

(56) References Cited

FOREIGN PATENT DOCUMENTS

JP         201654343 A     4/2016
JP         2016054343 A   *  4/2016

OTHER PUBLICATIONS

Masamichi Fujiwara et al., NFOEC National Fiber Optic Engineers Conference 2012, "Field Trial of 79.5-dB Loss Budget, 100-km Reach 10G-EPON System Using ALC Burst-Mode SOAs and EDC", Mar. 4, 2012.
Takuya Tsutsumi et al., Journal of Lightwave Technology, "Long-Reach and High-Splitting-Ratio 10G-EPON System With Semiconductor Optical Amplifier and N:1 OSU Protection", vol. 33, No. 8, pp. 1660-1665, (2015).

* cited by examiner

Fig. 6

| FIRST INPUT | SECOND INPUT | OUTPUT |
|---|---|---|
| 0 | 0 | 0 |
| 0 | 1 | 1 |
| 1 | 0 | 0 |
| 1 | 1 | 0 |

IN A CASE WHERE N=4

OPTICAL RECEIVING APPARATUS, OPTICAL TRANSMISSION SYSTEM, OPTICAL TRANSMISSION METHOD AND COMPUTER PROGRAM

CROSS-REFERENCE TO RELATED APPLICATIONS

This application is a 371 U.S. National Phase of International Application No. PCT/JP2019/026030 filed on Jul. 1, 2019. The entire disclosure of the above application is incorporated herein by reference.

TECHNICAL FIELD

The present invention relates to an optical reception device, an optical transmission system, an optical transmission method, and a computer program.

BACKGROUND ART

Currently, a PON (Passive Optical Network) method that is standardized by the IEEE (Institute of Electrical and Electronics Engineers) and the ITU-T (International Telecommunication Union Telecommunication Standardization Sector) is widely used in optical subscriber systems.

FIG. 10 is a configuration diagram of an optical transmission system 200 in which the PON method is used. As shown in FIG. 10, in the optical transmission system 200 in which the PON method is used, communication is performed between ONUs (Optical Network Units) 1-1 to 1-3, which are a plurality of subscriber devices, and an OLT (Optical Line Terminal) 2, which is a single station building side device. The ONUs 1-1 to 1-3 are connected to the OLT 2 via a transmission path 3. In downstream communication of the PON method, an optical signal transmitted from the OLT 2 is branched into a plurality of paths by an optical splitter 4 and received by the ONUs 1-1 to 1-3. At this time, each of the ONUs 1-1 to 1-3 selects and receives only a signal in a time slot that is allocated to the ONU.

On the other hand, in upstream communication, each of the ONUs 1-1 to 1-3 transmits a signal only in a time slot that is allocated to the ONU to avoid collision with signals transmitted from the other ONUs of the ONUs 1-1 to 1-3. As described above, in the PON method, the same optical fiber is shared by a plurality of subscribers to reduce the cost of equipment, and therefore it is possible to economically provide a high-speed optical access service.

In access networks in which the PON method is used, there are demands for extension of the maximum transmission distance and an increase in the number of branches from the optical splitter 4 in order to reduce the cost of equipment. Extension of the maximum transmission distance is desired because this makes it possible to integrate lines in a wide area into a single station building. Also, an increase in the number of branches from the optical splitter 4 is desired because the number of OLTs 2 and station buildings per line can be reduced if many lines are integrated into a single OLT 2, and an installation cost and an operation cost of equipment can be reduced.

FIG. 11 is a diagram showing a change in signal light intensity relative to the transmission distance in optical communication. In FIG. 11, the horizontal axis indicates the transmission distance and the vertical axis indicates the signal light intensity. In optical communication, loss in a transmission path increases as the transmission distance increases. Accordingly, as the transmission distance increases, an optical signal that is output from a transmitter 5 attenuates and the intensity of the optical signal entering a receiver 6 also decreases. As a result, thermal noise becomes large relative to the optical signal and a code error rate increases in the receiver 6. If the intensity of the optical signal reaching the receiver 6 is lower than the minimum intensity (minimum reception light sensitivity) that can be recognized by the receiver 6, communication is difficult.

Here, there is a method for amplifying an optical signal by using an optical amplifier that is arranged on a transmission path, as a method for compensating attenuation of the optical signal due to transmission over a long distance. FIG. 12 is a diagram showing the method for amplifying an optical signal by using an optical amplifier arranged on a transmission path. If intensity of an optical signal received by the receiver 6 is lower than the minimum reception light sensitivity due to transmission over a long distance, the code error rate increases and communication cannot be performed. If an optical amplifier 7 is provided in a stage preceding the receiver 6 and the intensity of the optical signal is increased to be higher than or equal to the minimum reception light sensitivity as shown in FIG. 12, the code error rate can be improved as a result of thermal noise being reduced relative to the optical signal. Conventionally, methods for increasing the transmission distance in PON systems by using relay optical amplifiers as those described in NPLs 1 to 3 have been proposed.

In a case where the optical amplifier 7 is used, intensity of the optical signal that is required to achieve the same code error rate increases when compared to a case where the optical amplifier 7 is not used. The lower the intensity of the optical signal entering the optical amplifier 7 is, the more noticeable the increase is. In this case, an effect of sufficiently improving the code error rate cannot be expected even if the optical signal is amplified. This is because the optical amplifier 7 deteriorates reception characteristics by generating ASE (Amplified Spontaneous Emission) noise, which is an optical noise, when amplifying the signal. As described above, in a case where the optical amplifier 7 is used, it is important to reduce the ASE noise emitted from the optical amplifier 7 in order to maximize the improvement effect of the optical amplifier 7.

As a method for increasing the transmission distance while reducing the influence of the ASE noise when increasing the transmission distance using the optical amplifier 7, there is a method for removing the ASE noise by using an optical filter as shown in FIG. 13. FIG. 13 is a configuration diagram of an optical transmission system 300 for increasing the transmission distance while reducing the influence of the ASE noise. In this method, an optical BPF 8 is inserted between the optical amplifier 7 and the receiver 6 to remove the ASE noise outside a signal band. The optical BPF 8 is an optical filter that has a characteristic of passing signals in the vicinity of the wavelength band of an optical signal. Thus, the ASE noise entering the receiver 6 can be reduced to improve the reception characteristics. In order to more effectively reduce the ASE noise with this method, it is effective to use an optical filter that has a narrow passband. If such an optical filter having a narrow pass width is used, the ASE noise outside the signal band can be more largely reduced. However, if the pass width of the optical filter is extremely narrowed, there is a problem in that high wavelength accuracy is required for the transmitter 5. For example, if the wavelength accuracy of the transmitter 5 is insufficient and the wavelength of an optical signal deviates from a prescribed value to be outside of the passband of the optical filter, communication is difficult because the optical BPF 8 removes not only the ASE noise but also the signal. Therefore, in order to improve the reception characteristics by narrowing the pass width of the optical BPF 8 for removing the ASE noise in the configuration using the optical amplifier 7, it is necessary to stabilize a transmission wavelength of the transmitter 5. As a method for stabilizing the transmission wavelength of the transmitter 5, it is conceivable to install a TEC (Thermoelectric Cooler) in the transmitter 5.

CITATION LIST

Non Patent Literature

[NPL 1] F. Saliou et al., "Single SOA to Extend Simultaneously the Optical Budget of Coexisting G-PON and 10G-PON", Tu.5.B.5, ECOC2010, 19-23 Sep. 2010, Torino, Italy.
[NPL 2] M. Fujiwara et al., "Field Trial of 79.5-dB Loss Budget, 100-km Reach 10G-EPON System Using ALC Burst-Mode SOAs and EDC", PD P5D.8, OFC/NFOEC Postdeadline Papers 2012 OSA.
[NPL 3] T. Tsutsumi et al., "Long-Reach and High-Splitting-Ratio 10G-EPON System With Semiconductor Optical Amplifier and N:1 OSU Protection", JOURNAL OF LIGHTWAVE TECHNOLOGY, VOL. 33, No. 8, pp. 1660-1665, Apr. 15, 2015.

SUMMARY OF THE INVENTION

Technical Problem

In an optical access NW, an OLT is shared by a plurality of users, and therefore, even if the cost of the OLT is increased to a certain extent, the increase only has a small influence on a unit device cost per user. On the other hand, at least one ONU is necessary for each user, and therefore an increase in the cost of the ONU directly leads to an increase in the unit device cost per user. Therefore, it is important to reduce the cost of the ONU in optical access NWs. In a case where an optical amplifier is used in upstream communication in an optical access NW, in order to achieve a high improvement effect, it is necessary to keep the transmission wavelength constant with high accuracy by installing a wavelength stabilization function such as the TEC in the ONU, which is the transmitter 5. However, there is a problem in that it is difficult to install the costly TEC in the ONU from the standpoint of reducing costs as described above.

In view of the above circumstances, the present invention has an object of providing a technology that can increase the transmission distance while reducing costs in an optical transmission system including an optical amplifier.

Means for Solving the Problem

One aspect of the present invention is an optical reception device including: a wavelength selection unit configured to split an optical signal that is amplified by an optical amplifier into different paths according to wavelengths by using a wavelength multiplexer/demultiplexer, and control a passage state of a passage target optical switch through which the optical signal is to be passed, out of a plurality of optical switches provided on the respective paths, to select an optical signal of a path where the optical signal entered and output the optical signal to a receiver; and a wavelength detection unit configured to detect the wavelength of an optical signal by using each of a plurality of optical detectors, determine the passage target optical switch based on a detection result, and output, to the determined passage target optical switch, a control signal for controlling the passage target optical switch so as to enter the passage state, the optical detectors being respectively provided on different paths that are different from the paths on which the plurality of optical switches are provided and that respectively correspond to wavelengths into which the optical signal is split by a wavelength multiplexer/demultiplexer.

On aspect of the present invention is the optical reception device described above, wherein the wavelength detection unit detects the path where the optical signal entered by monitoring optical intensity with respect to each wavelength and comparing the optical intensity with a threshold value, determines an optical switch provided on the detected path as the passage target optical switch, and outputs, to the determined passage target optical switch, the control signal for causing the passage target optical switch to enter the passage state.

One aspect of the present invention is the optical reception device described above, wherein, if an optical signal is detected in each of adjacent paths, the wavelength detection unit outputs, to the passage target optical switch, the control signal for causing the passage target optical switch to enter the passage state, the passage target optical switch being an optical switch that is provided on either one of the paths.

One aspect of the present invention is the optical reception device described above, wherein the wavelength detection unit includes the wavelength multiplexer/demultiplexer, the wavelength selection unit includes the wavelength multiplexer/demultiplexer, and optical filters that have the same transmission characteristics in a range of wavelength variation of an optical signal are used as the wavelength multiplexer/demultiplexers in order to associate the paths for respective wavelengths in the wavelength detection unit with the optical switches in the wavelength selection unit in one-to-one correspondence.

One aspect of the present invention is the optical reception device described above, further including the single wavelength multiplexer/demultiplexer including an optical filter that has the same transmission characteristics in a range of wavelength variation of an optical signal in order to associate the paths for respective wavelengths in the wavelength detection unit with the optical switches in the wavelength selection unit in one-to-one correspondence.

One aspect of the present invention is an optical transmission system including: an optical transmitter configured to transmit an optical signal; an optical amplifier configured to amplify an optical signal transmitted from the optical transmitter; and an optical reception device configured to receive an optical signal amplified by the optical amplifier and reduce noise generated by the optical amplifier from the received optical signal, wherein the optical reception device includes: a wavelength selection unit configured to split an optical signal amplified by the optical amplifier into different paths according to wavelengths by using a wavelength multiplexer/demultiplexer, and control a passage state of a passage target optical switch through which the optical signal is to be passed, out of a plurality of optical switches provided on the respective paths, to select an optical signal of a path where the optical signal entered and output the optical signal to a receiver; and a wavelength detection unit configured to detect the wavelength of an optical signal by using each of a plurality of optical detectors, determine the passage target optical switch based on a detection result, and output, to the determined passage target optical switch, a control signal for controlling the passage target optical switch so as to enter the passage state, the optical detectors being respectively provided on different paths that are different from the paths on which the plurality of optical switches are provided and that respectively correspond to wavelengths into which the optical signal is split by a wavelength multiplexer/demultiplexer.

One aspect of the present invention is an optical transmission method including: a wavelength selection step of splitting an optical signal that is amplified by an optical amplifier into different paths according to wavelengths by using a wavelength multiplexer/demultiplexer, and controlling a passage state of a passage target optical switch through which the optical signal is to be passed, out of a plurality of optical switches provided on the respective paths, to select an optical signal of a path where the optical signal entered and output the optical signal to a receiver; and a wavelength detection step of detecting the wavelength of an optical signal by using each of a plurality of optical detectors, determining the passage target optical switch based on a detection result, and outputting, to the determined passage target optical switch, a control signal for controlling the passage target optical switch so as to enter the passage state, the optical detectors being respectively provided on different paths that are different from the paths on which the plurality of optical switches are provided and that respectively correspond to wavelengths into which the optical signal is split by a wavelength multiplexer/demultiplexer.

One aspect of the present invention is a computer program for causing a computer to execute: a wavelength selection step of splitting an optical signal that is amplified by an optical amplifier into different paths according to wavelengths by using a wavelength multiplexer/demultiplexer, and controlling a passage state of a passage target optical switch through which the optical signal is to be passed, out of a plurality of optical switches provided on the respective paths, to select an optical signal of a path where the optical signal entered and output the optical signal to a receiver; and a wavelength detection step of detecting the wavelength of an optical signal by using each of a plurality of optical detectors, determining the passage target optical switch based on a detection result, and outputting, to the determined passage target optical switch, a control signal for controlling the passage target optical switch so as to enter the passage state, the optical detectors being respectively provided on different paths that are different from the paths on which the plurality of optical switches are provided and that respectively correspond to wavelengths into which the optical signal is split by a wavelength multiplexer/demultiplexer.

Effects of the Invention

According to the present invention, it is possible to increase the transmission distance while reducing costs in an optical transmission system including an optical amplifier.

BRIEF DESCRIPTION OF DRAWINGS

FIG. 6 is a diagram showing an example of a truth table in the first embodiment.

DESCRIPTION OF EMBODIMENTS

The following describes an embodiment of the present invention with reference to the drawings.

First Embodiment

Figure 1:
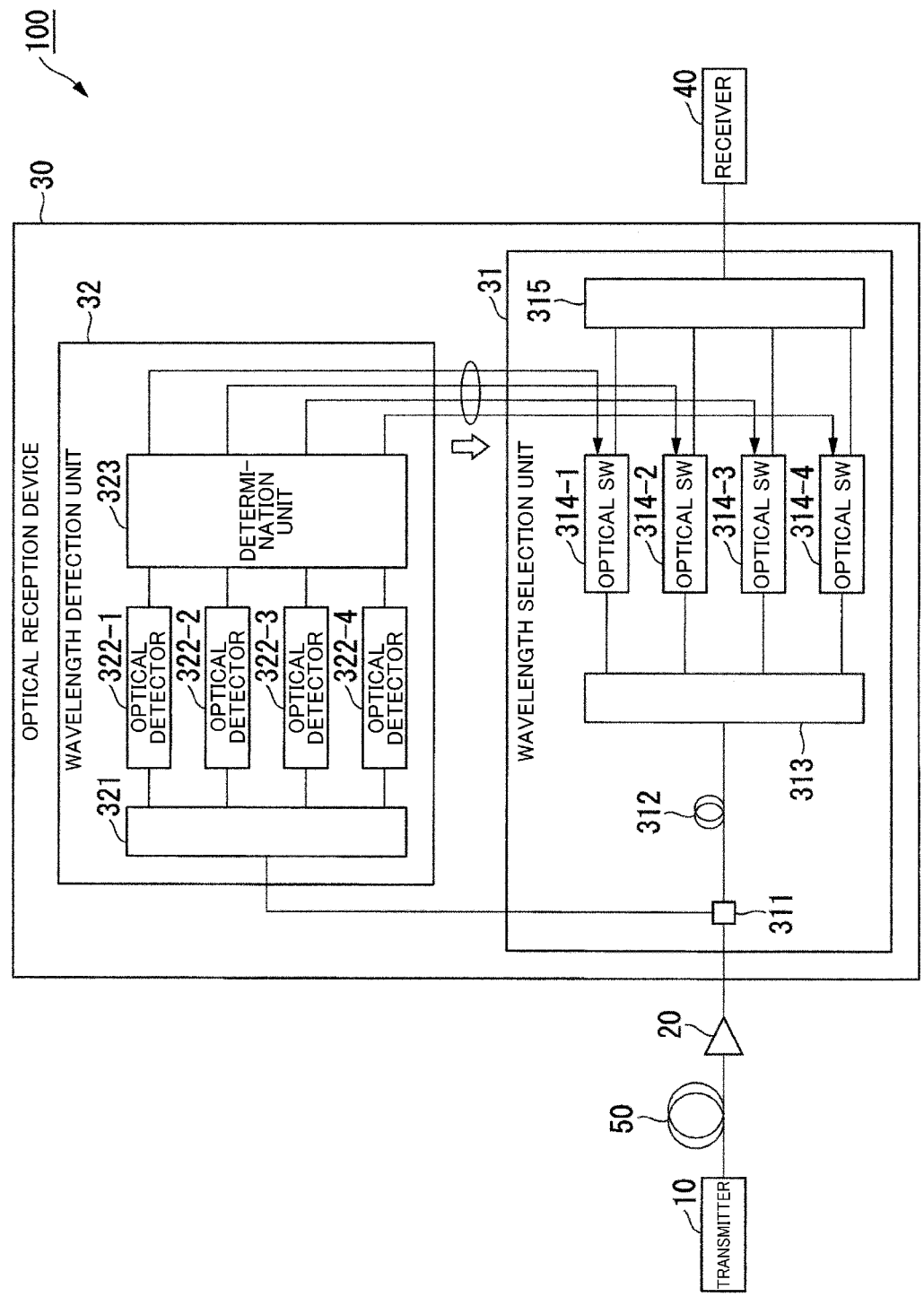
FIG. 1 is a system configuration diagram showing a system configuration of an optical transmission system according to a first embodiment.
Figure 10:
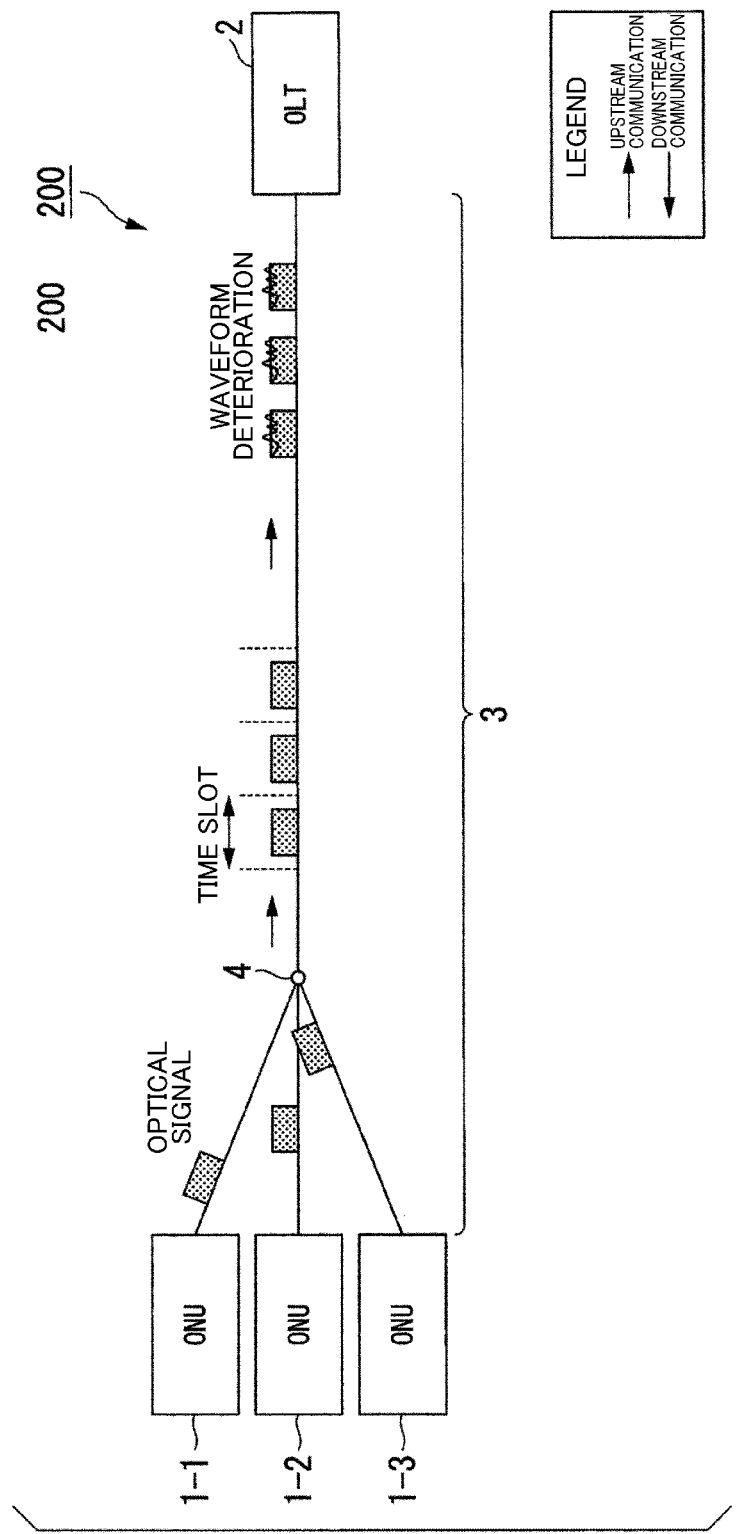
FIG. 10 is a configuration diagram of a conventional optical transmission system in which a PON method is used.
Figure 11:
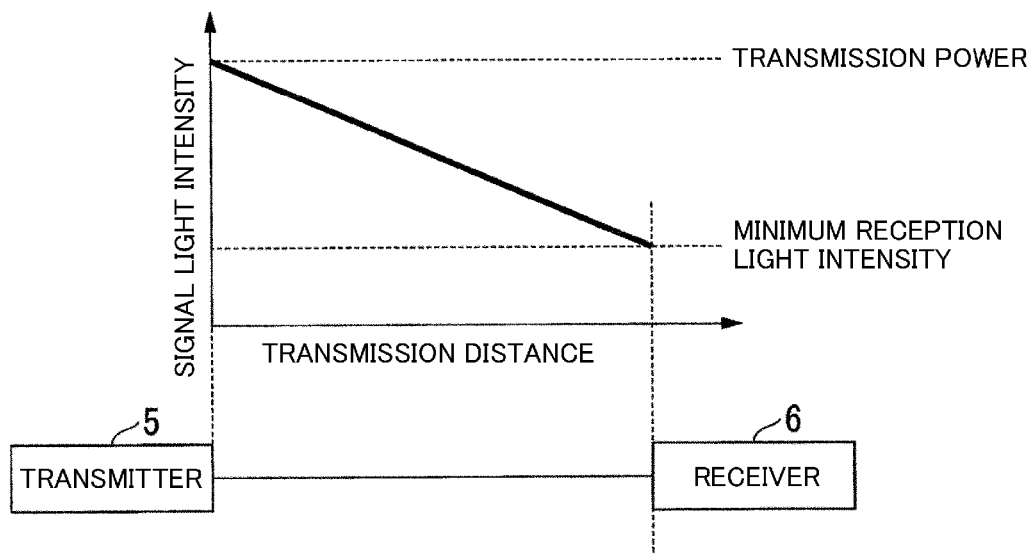
FIG. 11 is a diagram showing a change in signal light intensity relative to the transmission distance in optical communication.
Figure 12:
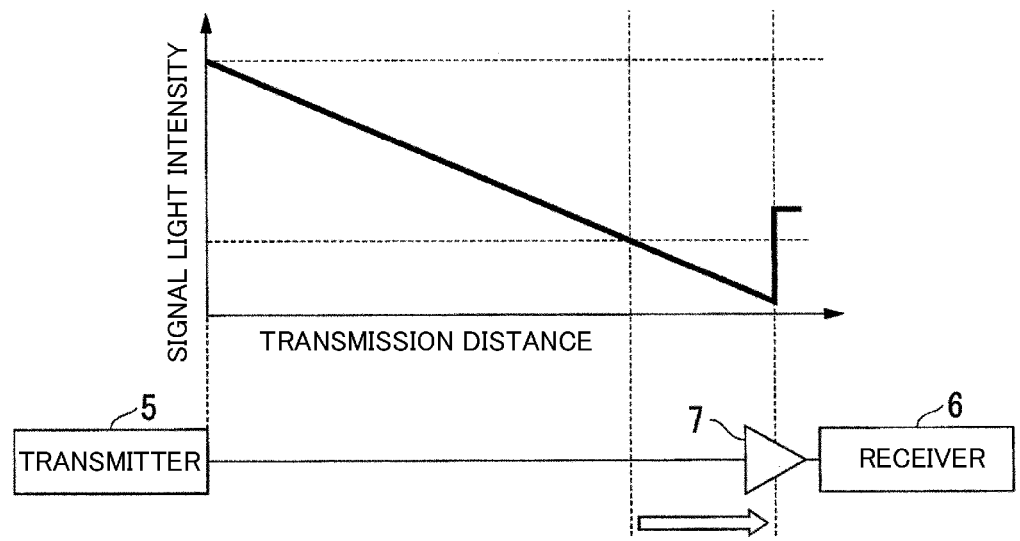
FIG. 12 is a diagram showing a method for amplifying an optical signal by using an optical amplifier arranged on a transmission path.
Figure 13:
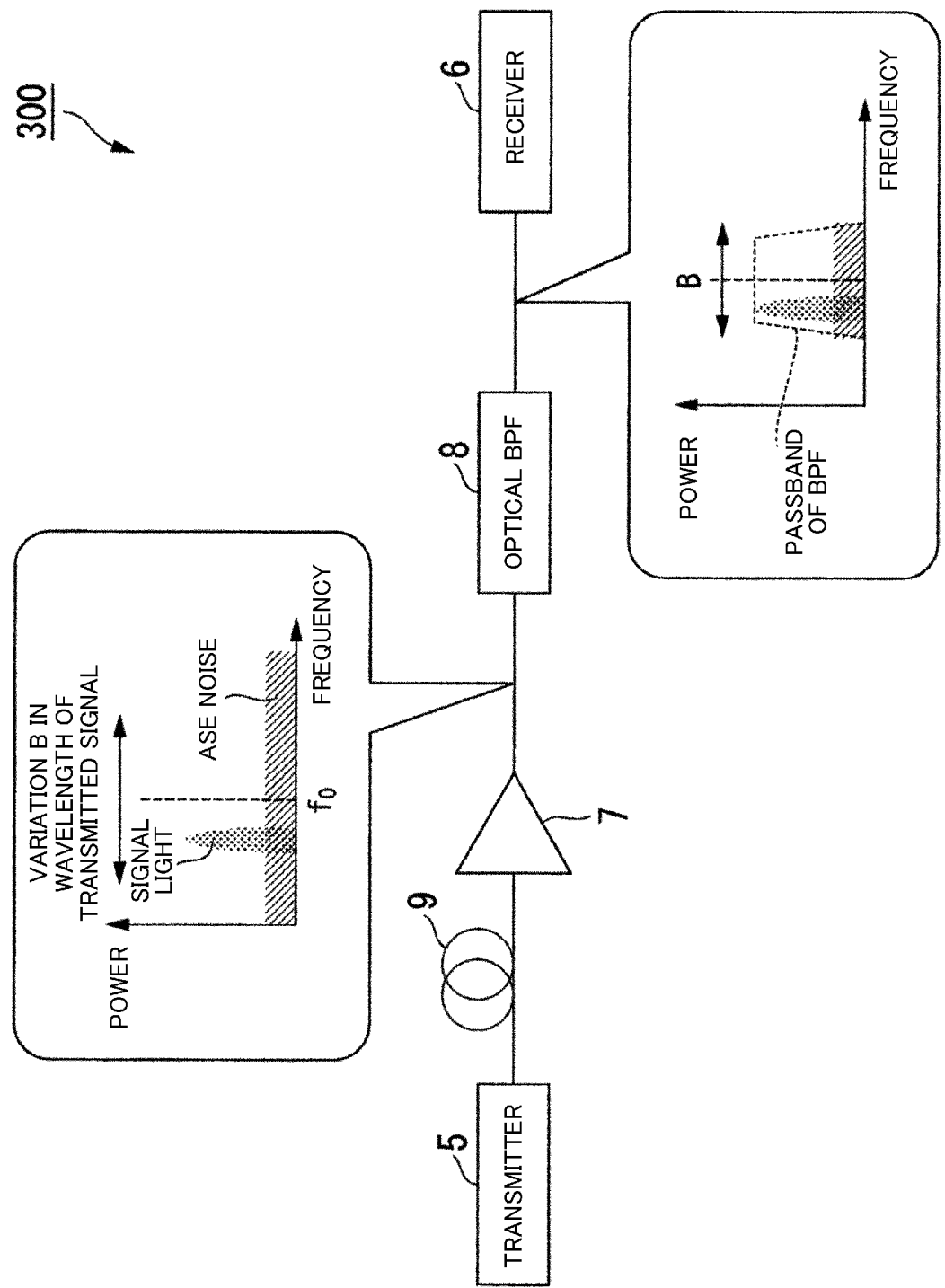
FIG. 13 is a configuration diagram of the optical transmission system 300 for increasing the transmission distance while reducing influence of ASE noise.

FIG. 1 is a system configuration diagram showing a system configuration of an optical transmission system 100 according to a first embodiment. The optical transmission system 100 includes a transmitter 10, an optical amplifier 20, an optical reception device 30, and a receiver 40. The transmitter 10 is included in, for example, each of the ONUs 1-1 to 1-3 in the optical transmission system 200 shown in FIG. 10 in which the PON method is used, and the receiver 40 is included in the OLT 2. The transmitter 10 and the receiver 40 are communicably connected to each other via a transmission path 50. The transmission path 50 transmits an optical signal transmitted from the transmitter 10 to the receiver 40 via the optical amplifier 20 and the optical reception device 30. The transmission path 50 is an optical fiber, for example.

Figure 2:
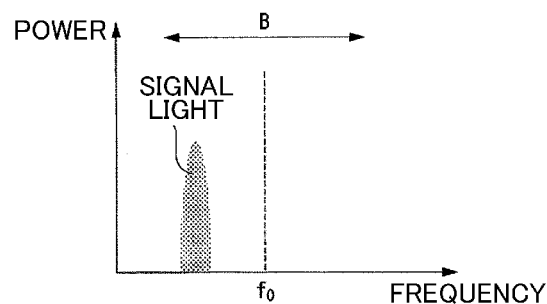
FIG. 2 is a diagram showing an example of an optical signal transmitted by a transmitter in the first embodiment.

The transmitter 10 transmits an optical signal to the transmission path 50. Here, assume that there is a variation of $\pm B/2$ about a wavelength $f_0$ that is the center of wavelength variation in the transmitter 10 as shown in FIG. 2. B shown in FIG. 2 indicates the range of wavelength variation of the transmitted signal. The optical signal transmitted from the transmitter 10 is transmitted through the transmission path 50 and then amplified by the optical amplifier 20.

Figure 3:
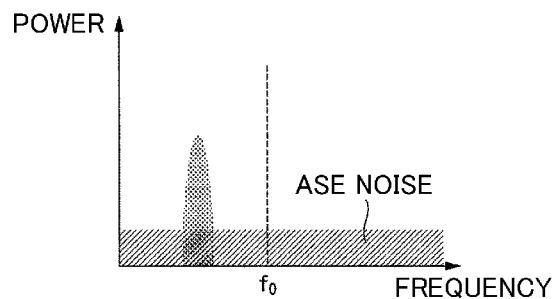
FIG. 3 is a diagram showing an example of an optical signal amplified by an optical amplifier in the first embodiment.

The optical amplifier 20 amplifies the optical signal transmitted from the transmitter 10. FIG. 3 is a diagram showing an example of the optical signal amplified by the optical amplifier 20. As shown in FIG. 3, the optical signal amplified by the optical amplifier 20 includes ASE noise. The ASE noise deteriorates reception characteristics of the receiver 40.

The optical reception device 30 reduces the ASE noise that is input to the receiver 40. Specifically, the optical reception device 30 narrows the band of the ASE noise to reduce the ASE noise input to the receiver 40. The optical reception device 30 is disposed between the optical amplifier 20 and the receiver 40.

The receiver 40 receives the input optical signal. The receiver 40 processes the received optical signal.

Next, a specific configuration of the optical reception device 30 will be described.

The optical reception device 30 includes a wavelength selection unit 31 and a wavelength detection unit 32.

The wavelength selection unit 31 is constituted by a coupler 311, a delay fiber 312, a wavelength multiplexer/demultiplexer 313, a plurality of optical SWs 314-1 to 314-4, and a wavelength multiplexer/demultiplexer 315.

The coupler 311 is a passive optical device that demultiplexes or multiplexes an optical signal. The coupler 311 demultiplexes an optical signal that is input to the optical reception device 30 into a first path and a second path. The optical signal is output to the delay fiber 312 via the first path and is output to the wavelength detection unit 32 via the second path. An optical splitter may also be used instead of the coupler 311.

The delay fiber 312 is a delay line for delaying input of the optical signal to the wavelength multiplexer/demultiplexer 313 that is disposed in a following stage. The delay fiber 312 is preferably long enough to secure time until output results from the wavelength detection unit 32 are input to the optical SWs 314-1 to 314-4.

The wavelength multiplexer/demultiplexer 313 splits the input optical signal into a plurality of ports according to wavelengths by using an optical filter that has periodic pass widths. The wavelength multiplexer/demultiplexer 313 is an AWG (Arrayed Waveguide Grating) or a multilayer optical filter, for example. Here, assume that the wavelength multiplexer/demultiplexer 313 has a characteristic of dividing the range $f_0 \pm B/2$ of wavelength variation of the transmitter 10 into N ports. At this time, the pass width of each port is B/N.

In the following description, it is assumed that the wavelength multiplexer/demultiplexer 313 has a characteristic of dividing the range $f_0 \pm B/2$ of wavelength variation of the transmitter 10 into four (N=4) ports. Note that N=4 is an example, and the wavelength multiplexer/demultiplexer 313 only needs to have a characteristic of dividing the range of wavelength variation of the transmitter 10 into at least two ports. The ports of the wavelength multiplexer/demultiplexer 313 are connected to the optical SWs 314-1 to 314-4, respectively. The frequency increases, i.e., the wavelength decreases in the order of the optical SWs 314-1 to 314-4, for example.

The optical SWs 314-1 to 314-4 are devices that perform control to pass or not to pass optical signals input from the outside. The optical SWs 314-1 to 314-4 perform control to pass or not to pass input optical signals based on control signals that are output from the wavelength detection unit 32. For example, if a control signal output from the wavelength detection unit 32 is an ON signal that indicates passing an optical signal, any of the optical SWs 314-1 to 314-4 to which the ON signal is input passes an optical signal. On the other hand, if a control signal output from the wavelength detection unit 32 is an OFF signal that indicates not passing an optical signal, any of the optical SWs 314-1 to 314-4 to which the OFF signal is input interrupts an optical signal.

The wavelength multiplexer/demultiplexer 315 multiplexes an optical signal output from any of the optical SWs 314-1 to 314-4 and outputs the multiplexed optical signal to the receiver 40. As described above, the wavelength selection unit 31 splits an optical signal amplified by the optical amplifier 20 into different paths according to wavelengths by using the wavelength multiplexer/demultiplexer 313, and controls a passage state of a passage target optical switch through which the optical signal is to be passed, out of the plurality of optical SWs 314-1 to 314-4 provided on the respective paths. Thus, the wavelength selection unit 31 selects an optical signal of a path where the optical signal entered, and outputs the optical signal to the receiver 40.

The wavelength detection unit 32 is constituted by a wavelength multiplexer/demultiplexer 321, a plurality of optical detectors 322-1 to 322-4, and a determination unit 323.

The wavelength multiplexer/demultiplexer 321 splits an input optical signal into a plurality of ports according to wavelengths by using an optical filter that has periodic pass widths. The wavelength multiplexer/demultiplexer 321 is an AWG, for example. A specific configuration of the wavelength multiplexer/demultiplexer 321 is similar to that of the wavelength multiplexer/demultiplexer 313. The ports of the wavelength multiplexer/demultiplexer 321 are connected to the optical detectors 322-1 to 322-4, respectively. The frequency increases, i.e., the wavelength decreases in the order of the optical detectors 322-1 to 322-4, for example.

As described above, in the first embodiment, optical filters that have the same transmission characteristics in the range of wavelength variation of an optical signal are used as the wavelength multiplexer/demultiplexers in the wavelength selection unit 31 and the wavelength detection unit 32 in order to associate the paths for respective wavelengths in the wavelength detection unit 32 with the optical SWs 314-1 to 314-4 in the wavelength selection unit 31 in one-to-one correspondence.

Figure 4:
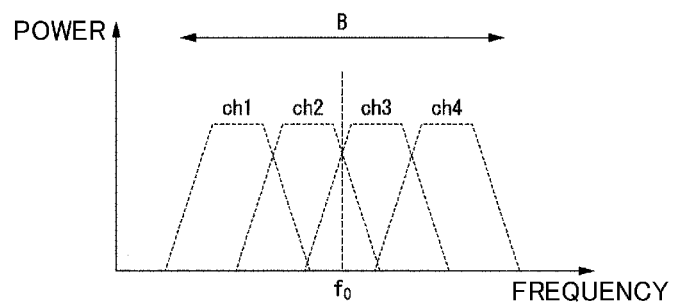
FIG. 4 is a diagram showing an example of passbands of a wavelength multiplexer/demultiplexer in the first embodiment.

FIG. 4 is a diagram showing an example of passbands of each wavelength multiplexer/demultiplexer in the first embodiment. In FIG. 4, the horizontal axis indicates the frequency and the vertical axis indicates power. When passbands of the wavelength multiplexer/demultiplexer 313 are denoted by ch1 to ch4 in ascending order of frequency, a signal in a frequency band denoted by ch1 is input via a port to the optical SW 314-1, a signal in a frequency band denoted by ch2 is input via a port to the optical SW 314-2, a signal in a frequency band denoted by ch3 is input via a port to the optical SW 314-3, and a signal in a frequency band denoted by ch4 is input via a port to the optical SW 314-4. When passbands of the wavelength multiplexer/demultiplexer 321 are denoted by ch1 to ch4 in ascending order of frequency, a signal in the frequency band denoted by ch1 is input via a port to the optical detector 322-1, a signal in the frequency band denoted by ch2 is input via a port to the optical detector 322-2, a signal in the frequency band denoted by ch3 is input via a port to the optical detector 322-3, and a signal in the frequency band denoted by ch4 is input via a port to the optical detector 322-4.

The optical detectors 322-1 to 322-4 are optical detectors that include photodiodes. The optical detectors 322-1 to 322-4 each detect the wavelength of an input optical signal. Specifically, the optical detectors 322-1 to 322-4 each detect the wavelength of an optical signal by monitoring intensity of the optical signal.

The determination unit 323 determines any of the optical SWs 314-1 to 314-4 (hereinafter referred to as a "passage target optical SW") through which an optical signal is to be passed, based on results of detection performed by the optical detectors 322-1 to 322-4. The determination unit 323 transmits an ON signal to the passage target optical SW. On the other hand, the determination unit 323 transmits OFF signals to optical SWs other than the passage target optical SW. As a result, only the passage target optical SW can pass an optical signal.

Figure 5:
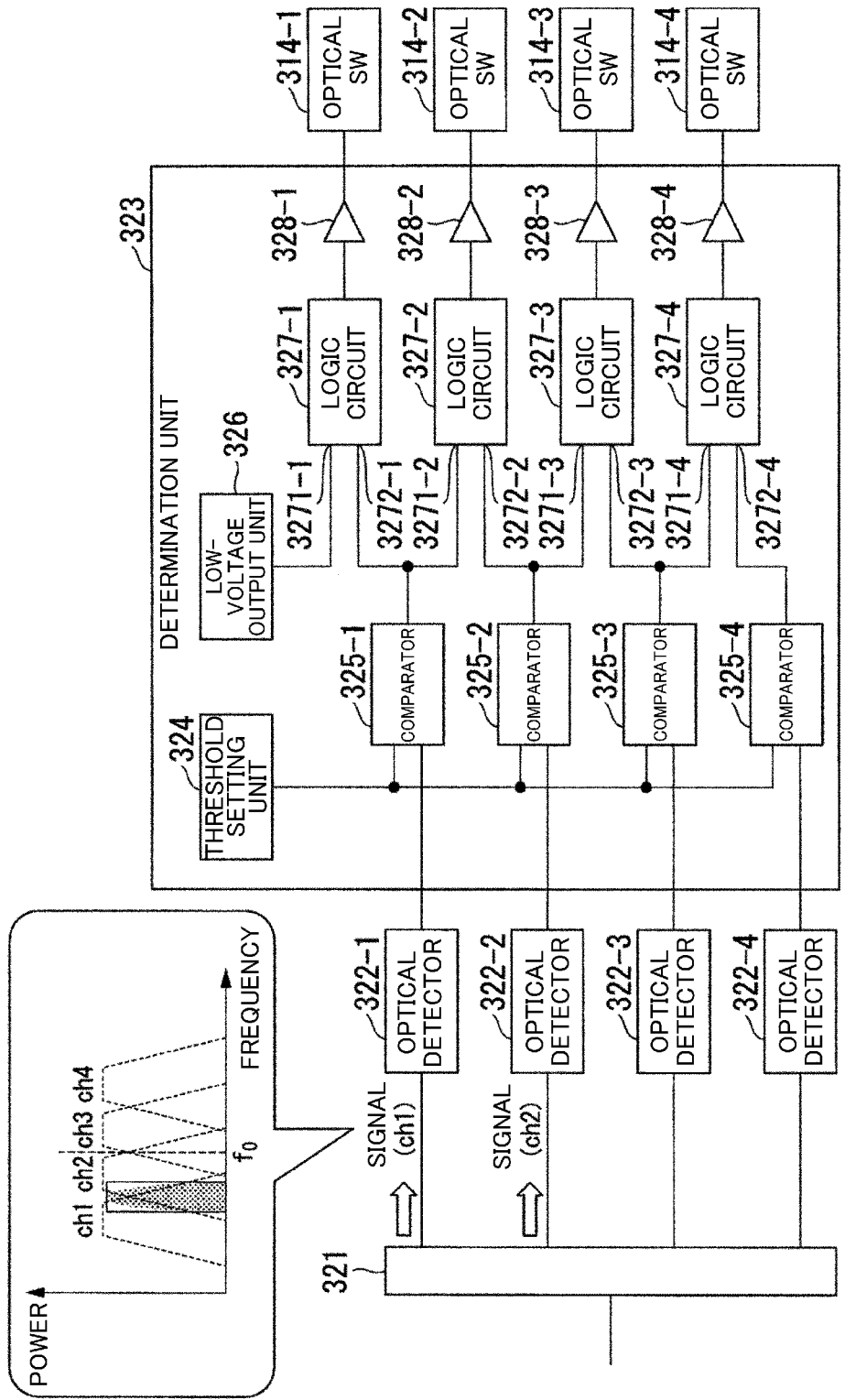
FIG. 5 is a diagram showing an internal configuration of a determination unit in the first embodiment.

FIG. 5 is a diagram showing an internal configuration of the determination unit 323 in the first embodiment.

The determination unit 323 is constituted by a threshold setting unit 324, a plurality of comparators 325-1 to 325-4, a low-voltage output unit 326, a plurality of logic circuits 327-1 to 327-4, and a plurality of voltage adjusters 328-1 to 328-4.

The threshold setting unit 324 sets, in the comparators 325-1 to 325-4, a threshold value that is to be compared with values that are input to the comparators 325-1 to 325-4. The threshold value only needs to be a value based on which it can be determined that an optical signal has been detected. Although a configuration in which the threshold setting unit 324 sets the same threshold value in the comparators 325-1 to 325-4 is shown, the threshold setting unit 324 may also set different threshold values for the comparators 325-1 to 325-4. In this case, the threshold setting unit 324 may also be provided for each of the comparators 325-1 to 325-4.

The comparators 325-1 to 325-4 compare detection results of the optical detectors 322-1 to 322-4 with the threshold value set by the threshold setting unit 324, and output comparison results to the logic circuits 327. Specifically, the comparators 325-1 to 325-4 each determine that an optical signal has been detected if a detection result is greater than or equal to the threshold value. If an optical signal has been detected, the comparators 325-1 to 325-4 each generate a HIGH(1) signal and output the HIGH(1) signal to the logic circuits 327-1 to 327-4. On the other hand, the comparators 325-1 to 325-4 each determine that an optical signal has not been detected if a detection result is smaller than the threshold value. If an optical signal has not been detected, the comparators 325-1 to 325-4 each generate a LOW(0) signal and output the LOW(0) signal to the logic circuits 327-1 to 327-4.

The low-voltage output unit 326 outputs a LOW(0) signal. Each of the logic circuits 327-1 to 327-4 is a circuit with two inputs and one output. The logic circuits 327-1 to 327-4 include first input units 3271-1 to 3271-4 and second input units 3272-1 to 3272-4 as input units. The logic circuits 327-1 to 327-4 output results based on a truth table shown in FIG. 6.

FIG. 6 is a diagram showing an example of the truth table in the first embodiment. In the truth table shown in FIG. 6, first input corresponds to input to the first input units 3271-1 to 3271-4 and second input corresponds to input to the second input units 3272-1 to 3272-4. Here, operations of the logic circuits 327-1 to 327-4 will be described. The logic circuits 327-1 to 327-4 each output a LOW(0) signal to a corresponding one of the voltage adjusters 328-1 to 328-4 if a LOW(0) signal is input from a corresponding one of the first input units 3271-1 to 3271-4 and a LOW(0) signal is input from a corresponding one of the second input units 3272-1 to 3272-4.

The logic circuits 327-1 to 327-4 each output a HIGH(1) signal to a corresponding one of the voltage adjusters 328-1 to 328-4 if a LOW(0) signal is input from a corresponding one of the first input units 3271-1 to 3271-4 and a HIGH(1) signal is input from a corresponding one of the second input units 3272-1 to 3272-4. The HIGH(1) signal output from the logic circuits 327-1 to 327-4 is a signal for causing the optical SWs 314-1 to 314-4 to enter a passage state. That is, the HIGH(1) signal output from the logic circuits 327-1 to 327-4 is a signal for causing an optical signal to be output to the receiver 40.

The logic circuits 327-1 to 327-4 each output a LOW(0) signal to a corresponding one of the voltage adjusters 328-1 to 328-4 if a HIGH(1) signal is input from a corresponding one of the first input units 3271-1 to 3271-4 and a LOW(0) signal is input from a corresponding one of the second input units 3272-1 to 3272-4. The LOW(0) signal output from the logic circuits 327-1 to 327-4 is a signal for causing the optical SWs 314-1 to 314-4 to enter an interrupting state. That is, the LOW(0) signal output from the logic circuits 327-1 to 327-4 is a signal for keeping an optical signal from being output to the receiver 40.

The logic circuits 327-1 to 327-4 each output a LOW(0) signal to a corresponding one of the voltage adjusters 328-1 to 328-4 if a HIGH(1) signal is input from a corresponding one of the first input units 3271-1 to 3271-4 and a HIGH(1) signal is input from a corresponding one of the second input units 3272-1 to 3272-4.

As described above, each of the logic circuits 327-1 to 327-4 is a logic circuit that outputs a HIGH(1) signal only when a LOW(0) signal is input from a corresponding one of the first input units 3271-1 to 3271-4 and a HIGH(1) signal is input from a corresponding one of the second input units 3272-1 to 3272-4.

The comparators 325-1 to 325-4 and the logic circuits 327-1 to 327-4 may also be implemented by a combination of processing performed in a computer such as a FPGA (Field Programmable Gate Array) or an ASIC (Application Specific Integrated Circuit) and analog circuits.

The voltage adjusters 328-1 to 328-4 generate control signals (electrical signals) for controlling the optical SWs 314-1 to 314-4 based on signals output from the logic circuits 327-1 to 327-4. If a signal output from a corresponding one of the logic circuits 327-1 to 327-4 is a HIGH(1) signal, the voltage adjusters 328-1 to 328-4 each generate a control signal for causing a corresponding one of the optical SWs 314-1 to 314-4 to enter the passage state and output the generated control signal to the corresponding one of the optical SWs 314-1 to 314-4. If a signal output from a corresponding one of the logic circuits 327-1 to 327-4 is a LOW(0) signal, the voltage adjusters 328-1 to 328-4 each generate a control signal for causing a corresponding one of the optical SWs 314-1 to 314-4 to enter the interrupting state and output the generated control signal to the corresponding one of the optical SWs 314-1 to 314-4.

In a case where the wavelength of an optical signal is in a region where passbands of two adjacent ports of the wavelength multiplexer/demultiplexer 321 in the wavelength detection unit 32 overlap, if the optical signal has been detected in both of the ports and the determination unit 323 determines that the optical signal has been detected in the two ports, two optical SWs in the wavelength selection unit 31 may enter the passage state and two optical signals may enter the optical reception device 30. However, in this case, there is a concern that noise may be generated as a result of the optical signals passed through two paths interfering with each other in the receiver 40. In order to avoid such a situation, the optical reception device 30 includes the comparators 325-1 to 325-4 and the logic circuits 327-1 to 327-4 to determine only one of two ports in the determination unit 323 even if an optical signal is detected in the two ports.

As described above, the wavelength detection unit 32 detects the wavelength of an optical signal by using each of the plurality of optical detectors 322-1 to 322-4, determines a passage target optical switch based on a detection result, and outputs, to the determined passage target optical switch, a control signal for controlling the passage target optical switch so as to enter the passage state, the optical detectors 322-1 to 322-4 being respectively provided on different paths that are different from the paths on which the plurality of optical SWs 314-1 to 314-4 are provided and that respectively correspond to wavelengths into which an optical signal is split by the wavelength multiplexer/demultiplexer 321.

Figure 7:
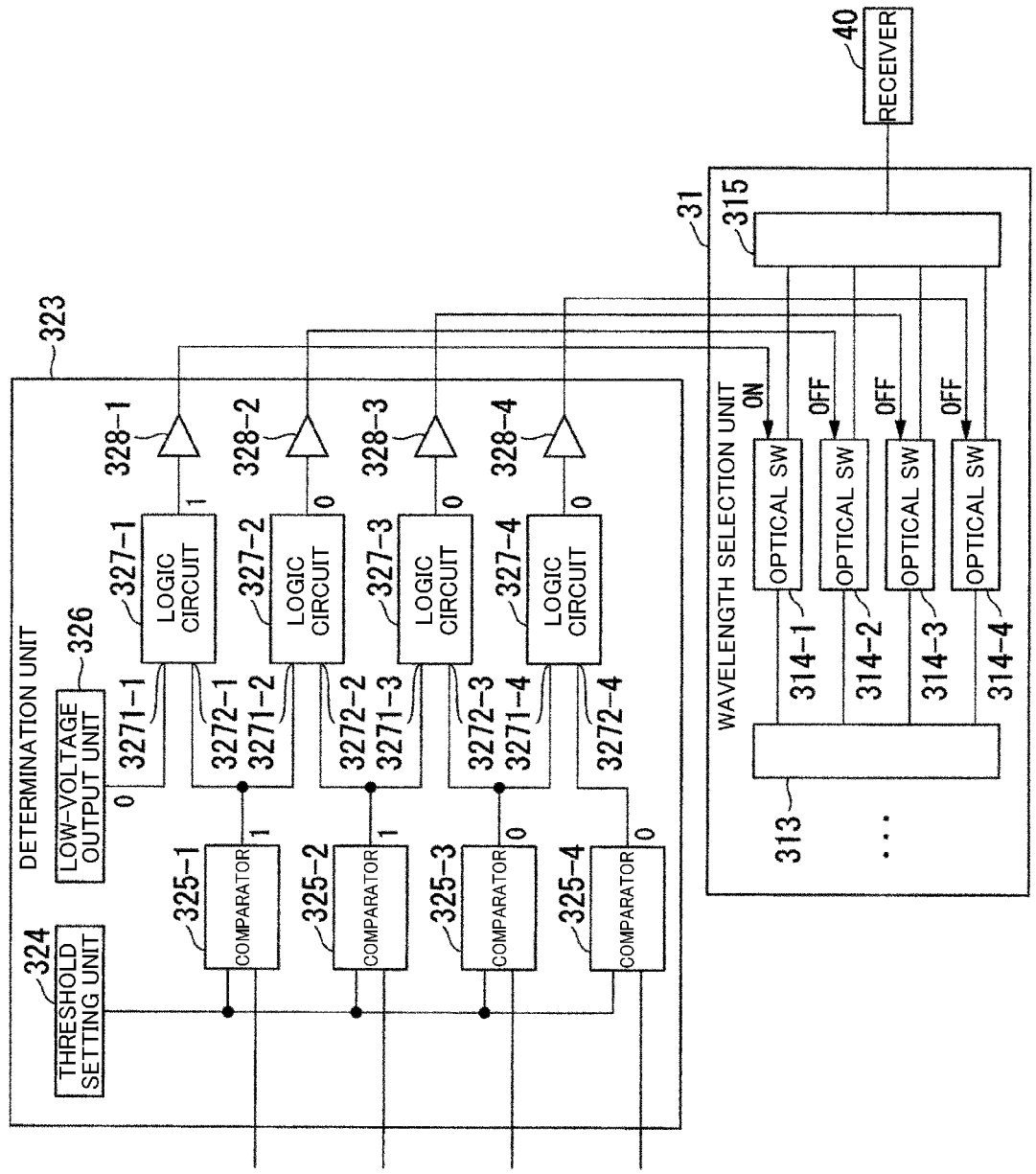
FIG. 7 is a diagram for describing a specific operation example of an optical reception device in the first embodiment.

FIG. 7 is a diagram for describing a specific operation example of the optical reception device 30 in the first embodiment.

Assume that, as shown in FIG. 7, a HIGH(1) signal is output from the comparator 325-1, a HIGH(1) signal is output from the comparator 325-2, a LOW(0) signal is output from the comparator 325-3, and a LOW(0) signal is output from the comparator 325-4 as results of comparison performed by the comparators 325-1 to 325-4.

In this case, the first input unit 3271-1 of the logic circuit 327-1 inputs a LOW(0) signal from the low-voltage output unit 326, and the second input unit 3272-1 inputs the HIGH(1) signal from the comparator 325-1. The logic circuit 327-1 outputs a HIGH(1) signal to the voltage adjuster 328-1 based on the plurality of input signals.

The voltage adjuster 328-1 generates a control signal (ON signal) for causing the optical SW 314-1 to enter the passage state because the signal output from the logic circuit 327-1 is the HIGH(1) signal. The voltage adjuster 328-1 outputs the generated control signal to the optical SW 314-1.

The optical SW 314-1 performs control to pass an optical signal because the control signal output from the voltage adjuster 328-1 is the ON signal.

The first input unit 3271-2 of the logic circuit 327-2 inputs the HIGH(1) signal from the comparator 325-1, and the second input unit 3272-2 inputs the HIGH(1) signal from the comparator 325-2. The logic circuit 327-2 outputs a LOW(0) signal to the voltage adjuster 328-2 based on the plurality of input signals.

The voltage adjuster 328-2 generates a control signal (OFF signal) for causing the optical SW 314-2 to enter the interrupting state because the signal output from the logic circuit 327-2 is the LOW(0) signal. The voltage adjuster 328-2 outputs the generated control signal to the optical SW 314-2.

The optical SW 314-2 performs control to interrupt an optical signal because the control signal output from the voltage adjuster 328-2 is the OFF signal.

The first input unit 3271-3 of the logic circuit 327-3 inputs the HIGH(1) signal from the comparator 325-2, and the second input unit 3272-3 inputs the LOW(0) signal from the comparator 325-3. The logic circuit 327-3 outputs a LOW(0) signal to the voltage adjuster 328-3 based on the plurality of input signals.

The voltage adjuster 328-3 generates a control signal (OFF signal) for causing the optical SW 314-3 to enter the interrupting state because the signal output from the logic circuit 327-3 is the LOW(0) signal. The voltage adjuster 328-3 outputs the generated control signal to the optical SW 314-3.

The optical SW 314-3 performs control to interrupt an optical signal because the control signal output from the voltage adjuster 328-3 is the OFF signal.

The first input unit 3271-4 of the logic circuit 327-4 inputs the LOW(0) signal from the comparator 325-3, and the second input unit 3272-4 inputs the LOW(0) signal from the comparator 325-4. The logic circuit 327-4 outputs a LOW(0) signal to the voltage adjuster 328-4 based on the plurality of input signals.

The voltage adjuster 328-4 generates a control signal (OFF signal) for causing the optical SW 314-4 to enter the interrupting state because the signal output from the logic circuit 327-4 is the LOW(0) signal. The voltage adjuster 328-4 outputs the generated control signal to the optical SW 314-4.

The optical SW 314-4 performs control to interrupt an optical signal because the control signal output from the voltage adjuster 328-3 is the OFF signal.

As a result of control being performed as shown in FIG. 7, out of optical signals input to the wavelength selection unit 31, only an optical signal that flows through the port corresponding to the optical SW 314-1 out of the plurality of ports of the wavelength multiplexer/demultiplexer 313 is input to the wavelength multiplexer/demultiplexer 315. The wavelength multiplexer/demultiplexer 315 multiplexes the input optical signal and outputs the multiplexed signal to the receiver 40. The receiver 40 receives the optical signal output from the optical reception device 30.

Figure 8:
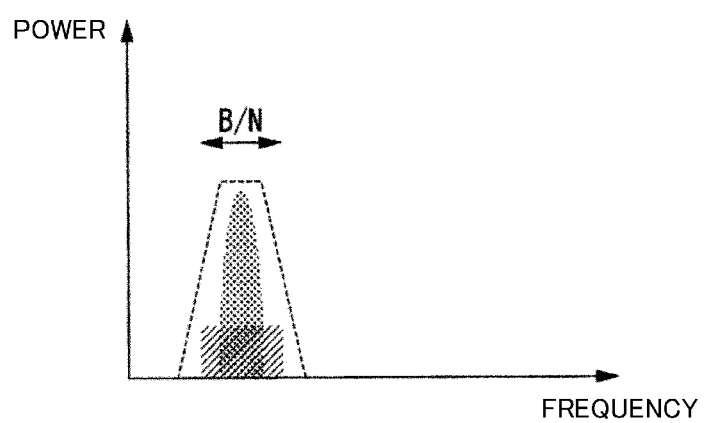
FIG. 8 is a diagram showing an example of an optical signal input to a receiver.

FIG. 8 is a diagram showing an example of the optical signal input to the receiver 40.

As a result of only one of the optical SWs 314-1 to 314-4 corresponding to the port where an optical signal entered being caused to enter the passage state as described above, the optical signal is received by the receiver 40, and at this time, the band of ASE noise input to the receiver 40 is the band (B/N) of the single port. Therefore, even if the optical signal has a frequency variation of $f_0 \pm B/2$, the receiver 40 only receives ASE noise in a band narrower than the range of variation, and therefore an improvement in the reception characteristics can be expected.

According to the optical transmission system 100 configured as described above, the wavelength detection unit 32 detects the wavelength of an optical signal and detects a port where the optical signal entered based on the detection result. Through this processing, the wavelength detection unit 32 can find a port in the wavelength selection unit 31 where the optical signal entered, and accordingly determines an optical SW that is connected to the port, i.e., a passage target optical SW, out of the optical SWs 314-1 to 314-4. Then, the wavelength detection unit 32 transmits, to the passage target optical SW, a control signal to cause the passage target optical SW to enter the passage state. Thus, the optical reception device 30 can pass only a signal in a specific band in which the optical signal is included. Accordingly, the band of ASE noise that enters the receiver 40 can be narrowed. Therefore, deterioration of the reception characteristics due to the ASE noise can be suppressed. As a result, it is possible to increase the transmission distance while reducing costs in the optical transmission system including the optical amplifier.

A delay may occur from when the wavelength detection unit 32 detects arrival of an optical signal until when any of the optical SWs 314-1 to 314-4 in the wavelength selection unit 31 enters the passage state. In this case, an optical signal that has entered the optical SWs 314-1 to 314-4 is lost. Therefore, the delay fiber 312 is provided between the coupler 311 and the wavelength multiplexer/demultiplexer 313 in the optical reception device 30 so that control of the optical SWs 314-1 to 314-4 can be sufficiently performed by the wavelength detection unit 32. Thus, arrival of the optical signal to the optical SWs 314-1 to 314-4 is delayed. As a result, the optical signal can be kept from being lost.

The following describes a variation of the optical transmission system 100 in the first embodiment.

Although a configuration in which the coupler 311 is included in the wavelength selection unit 31 of the optical reception device 30 has been described, the coupler 311 may also be provided outside of the wavelength selection unit 31. For example, a configuration is also possible in which the optical reception device 30 includes the coupler 311, the wavelength selection unit 31, and the wavelength detection unit 32, and an optical signal demultiplexed by the coupler 311 is input to the wavelength selection unit 31 and the wavelength detection unit 32.

Second Embodiment

In the first embodiment, there is a premise that the delay fiber is inserted, assuming a case where there is a strict requirement regarding delay from when an optical signal reaches the wavelength detection unit to when an optical SW in the wavelength selection unit operates. Here, it is envisaged that wavelength variation of an optical signal is small in a P2P configuration in which a single transmitter and a single receiver are connected via a single optical fiber, for example. In such a case, influence of the delay is small except for immediately after the start of communication, and therefore it is expected that the delay fiber is unnecessary. That is, a configuration in which wavelength multiplexer/demultiplexers having similar characteristics are respectively included in the wavelength detection unit and the wavelength selection unit is assumed in the first embodiment, based on the premise that the delay fiber is inserted. However, if the delay fiber is unnecessary, the wavelength multiplexer/demultiplexers respectively provided in the wavelength detection unit and the wavelength selection unit can be integrated into a single wavelength multiplexer/demultiplexer. Therefore, a configuration of the case where the delay fiber is unnecessary will be described in the second embodiment.

Figure 9:
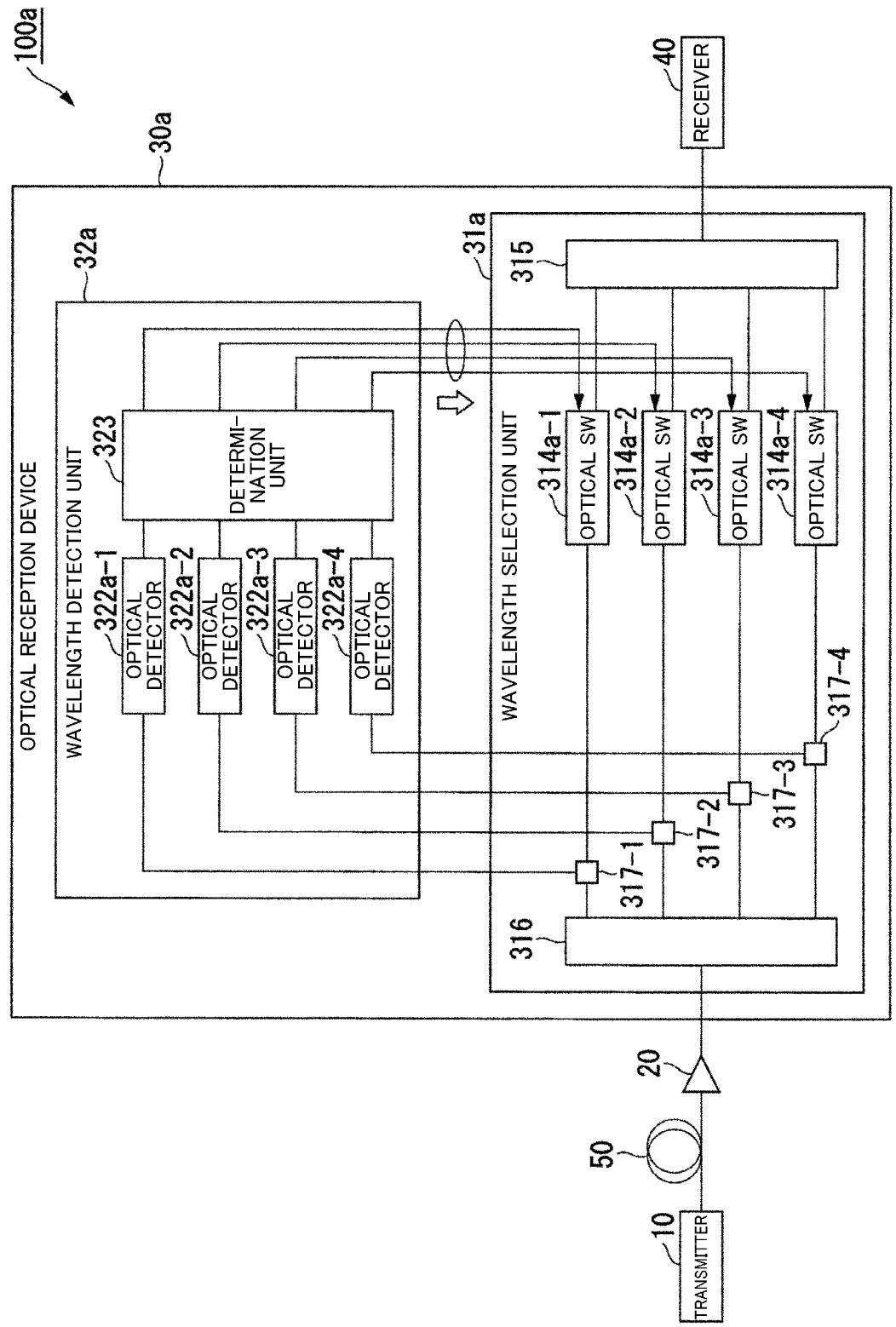
FIG. 9 is a system configuration diagram showing a system configuration of an optical transmission system according to a second embodiment.

FIG. 9 is a system configuration diagram showing a system configuration of an optical transmission system 100a according to the second embodiment. The optical transmission system 100a includes the transmitter 10, the optical amplifier 20, an optical reception device 30a, and the receiver 40. The system configuration in the second embodiment is similar to that in the first embodiment except for the configuration of the optical reception device 30a. Therefore, the following describes the configuration of the optical reception device 30a.

The optical reception device 30a includes a wavelength selection unit 31a and a wavelength detection unit 32a. The wavelength selection unit 31a is constituted by a plurality of optical SWs 314a-1 to 314a-4, the wavelength multiplexer/demultiplexer 315, a wavelength multiplexer/demultiplexer 316, and a plurality of couplers 317a-1 to 317a-4.

The wavelength multiplexer/demultiplexer 316 splits an input optical signal into a plurality of ports according to wavelengths by using an optical filter that has periodic pass widths. The wavelength multiplexer/demultiplexer 316 is an AWG, for example. A specific configuration of the wavelength multiplexer/demultiplexer 316 is similar to that of the wavelength multiplexer/demultiplexer 313. The ports of the wavelength multiplexer/demultiplexer 316 are connected to the couplers 317-1 to 317-4, respectively. The frequency increases, i.e., the wavelength decreases in the order of the couplers 317-1 to 317-4, for example.

The couplers 317a-1 to 317a-4 demultiplex optical signals that have different wavelengths and are output from corresponding ports of the wavelength multiplexer/demultiplexer 316 into a first path and a second path. The optical signals are output to the optical SWs 314a-1 to 314a-4 via the first path and are output to the wavelength detection unit 32a via the second path.

The optical SWs 314a-1 to 314a-4 are devices that perform control to pass or not to pass optical signals input from the outside. The optical SWs 314a-1 to 314a-4 perform control to pass or not to pass input optical signals based on control signals that are output from the wavelength detection unit 32a. The optical SW 314a-1 is connected to the coupler 317a-1. The optical SW 314a-2 is connected to the coupler 317a-2. The optical SW 314a-3 is connected to the coupler 317a-3. The optical SW 314a-4 is connected to the coupler 317a-4.

As described above, the wavelength selection unit 31a splits an optical signal that is amplified by the optical amplifier 20 into different paths according to wavelengths by using the wavelength multiplexer/demultiplexer 316, and controls a passage state of a passage target optical switch through which the optical signal is to be passed, out of the plurality of optical SWs 314a-1 to 314a-4 provided on the respective paths, to select an optical signal of a path where the optical signal entered, and output the optical signal to the receiver 40.

The wavelength detection unit 32a is constituted by a plurality of optical detectors 322a-1 to 322a-4 and the determination unit 323. The wavelength detection unit 32a differs from the wavelength detection unit 32 in that the wavelength detection unit 32a does not include the wavelength multiplexer/demultiplexer 321.

The optical detectors 322a-1 to 322a-4 are optical detectors that include photodiodes. The optical detectors 322a-1 to 322a-4 each detect the wavelength of an input optical signal. That is, the optical detectors 322a-1 to 322a-4 each detect intensity of the optical signal. The optical detector 322a-1 is connected to the coupler 317a-1. The optical detector 322a-2 is connected to the coupler 317a-2. The optical detector 322a-3 is connected to the coupler 317a-3. The optical detector 322a-4 is connected to the coupler 317a-4.

As described above, the wavelength detection unit 32a detects the wavelength of an optical signal by using each of the plurality of optical detectors 322a-1 to 322a-4, determines a passage target optical switch based on a detection result, and outputs, to the determined passage target optical switch, a control signal for controlling the passage target optical switch so as to enter the passage state, the optical detectors 322a-1 to 322a-4 being respectively provided on different paths that are different from the paths on which the plurality of optical SWs 314a-1 to 314a-4 are provided and that respectively correspond to wavelengths into which the optical signal is split by the wavelength multiplexer/demultiplexer 316.

According to the optical transmission system 100a configured as described above, effects similar to those achieved in the first embodiment can be achieved.

In the optical transmission system 100a, the wavelength multiplexer/demultiplexer 316 that is common to the wavelength selection unit 31a and the wavelength detection unit 32a is used in order to associate the paths for respective wavelengths in the wavelength detection unit 32a with the optical SWs 314a-1 to 314a-4 in the wavelength selection unit 31a in one-to-one correspondence. This eliminates the need to provide wavelength multiplexer/demultiplexers respectively in the wavelength selection unit 31a and the wavelength detection unit 32a like the first embodiment. Therefore, the number of components of the device can be reduced. Accordingly, the cost of the device can be reduced.

Variations common to the first embodiment and the second embodiment will be described. In the embodiments described above, an example in which the optical amplifier 20 is disposed in a stage preceding the wavelength selection unit 31 or 31a is described. Here, in the present invention, ASE noise that is generated when an optical signal is amplified is reduced by the wavelength multiplexer/demultiplexer 315 that is disposed in a stage following the optical SWs 314-1 to 314-4 or 314a-1 to 314a-4. Accordingly, the position where the optical amplifier 20 is disposed only needs to be on the transmitter 10 side of the wavelength multiplexer/demultiplexer 315 disposed in the stage following the optical SWs 314-1 to 314-4.

Each of the optical reception devices 30 and 30a may also be configured to constitute a single unit together with the receiver 40.

The optical reception devices 30 and 30a in the above embodiments may also be realized using a computer. In this case, the optical reception devices may also be realized by recording a program for realizing the functions in a computer-readable recording medium and causing a computer system to read and execute the program recorded in the recording medium. Note that the "computer system" referred to here includes an OS and hardware such as peripherals.

Also, the "computer-readable recording medium" refers to a portable medium such as a flexible disk, a magneto-optical disk, a ROM, or a CD-ROM, or a storage device built in the computer system, such as a hard disk. Furthermore, examples of the "computer-readable recording medium" include a medium that dynamically holds the program for a short period of time, like a communication line when transmitting the program through a network such as the Internet or a communication line such as a telephone line, and a medium that holds the program for a certain period of time like a volatile memory in a computer system that serves as a server or a client in that case. Also, the above-described program may be a program for realizing some of the aforementioned functions, a program that can realize the aforementioned functions in combination with a program that has already been recorded in the computer system, or a program that is realized using a programmable logic device such as a FPGA (Field Programmable Gate Array).

Although the embodiments of the present invention have been described in detail with reference to the drawings, specific configurations are not limited to these embodiments, and design or the like made without departing from gist of the present invention is also included in the scope of the present invention.

INDUSTRIAL APPLICABILITY

The present invention can be applied to an optical transmission system.

REFERENCE SIGNS LIST

10 Transmitter
20 Optical amplifier
30, 30a Optical reception device
40 Receiver
31, 31a Wavelength selection unit
32, 32a Wavelength detection unit
311 Coupler
312 Delay fiber
313 Wavelength multiplexer/demultiplexer
314-1 to 314-4, 314a-1 to 314a-4 Optical SW
315 Wavelength multiplexer/demultiplexer
316 Wavelength multiplexer/demultiplexer
317-1 to 317-4 Coupler
321 Wavelength multiplexer/demultiplexer
322-1 to 322-4, 322a-1 to 322a-4 Optical detector
323 Determination unit
324 Threshold setting unit
325-1 to 325-4 Comparator
326 Low-voltage output unit
327-1 to 327-4 Logic circuit
328-1 to 328-4 Voltage adjuster

The invention claimed is:

1. An optical reception device comprising:
a wavelength selection unit configured to split an optical signal that is amplified by an optical amplifier into different paths according to wavelengths by using a wavelength multiplexer/demultiplexer, and control a passage state of a passage target optical switch through which the optical signal is to be passed, out of a plurality of optical switches provided on the respective paths, to select an optical signal of a path where the optical signal entered and output the optical signal to a receiver; and
a wavelength detection unit configured to detect the wavelength of an optical signal by using each of a plurality of optical detectors, determine the passage target optical switch based on a detection result, and output, to the determined passage target optical switch, a control signal for controlling the passage target optical switch so as to enter the passage state, the optical detectors being respectively provided on different paths that are different from the paths on which the plurality of optical switches are provided and that respectively correspond to wavelengths into which the optical signal is split by a wavelength multiplexer/demultiplexer.

2. The optical reception device according to claim 1, wherein the wavelength detection unit detects the path where the optical signal entered by monitoring optical intensity with respect to each wavelength and comparing the optical intensity with a threshold value, determines an optical switch provided on the detected path as the passage target optical switch, and outputs, to the determined passage target optical switch, the control signal for causing the passage target optical switch to enter the passage state.

3. The optical reception device according to claim 2, wherein the wavelength detection unit includes a logic circuit for determining an optical switch from optical switches that are respectively provided on adjacent paths if an optical signal is detected in each of the adjacent paths, and
the logic circuit includes a plurality of input units and an output unit and outputs a signal for causing the passage target optical switch to enter the passage state if a first signal and a second signal are input to the plurality of input units, the first signal indicating that the optical intensity is lower than the threshold value, the second signal indicating that the optical intensity is at least the threshold value.

4. The optical reception device according to claim 1, wherein the wavelength detection unit includes the wavelength multiplexer/demultiplexer,
the wavelength selection unit includes the wavelength multiplexer/demultiplexer, and
optical filters that have the same transmission characteristics in a range of wavelength variation of an optical signal are used as the wavelength multiplexer/demultiplexers in order to associate the paths for respective wavelengths in the wavelength detection unit with the optical switches in the wavelength selection unit in one-to-one correspondence.

5. The optical reception device according to claim 1, further comprising
the single wavelength multiplexer/demultiplexer including an optical filter that has the same transmission characteristics in a range of wavelength variation of an optical signal in order to associate the paths for respective wavelengths in the wavelength detection unit with the optical switches in the wavelength selection unit in one-to-one correspondence.

6. An optical transmission system comprising:
an optical transmitter configured to transmit an optical signal;
an optical amplifier configured to amplify an optical signal transmitted from the optical transmitter; and
an optical reception device configured to receive an optical signal amplified by the optical amplifier and reduce noise generated by the optical amplifier from the received optical signal,
wherein the optical reception device includes:
a wavelength selection unit configured to split an optical signal amplified by the optical amplifier into different paths according to wavelengths by using a wavelength multiplexer/demultiplexer, and control a passage state of a passage target optical switch through which the optical signal is to be passed, out of a plurality of optical switches provided on the respective paths, to select an optical signal of a path where the optical signal entered and output the optical signal to a receiver; and
a wavelength detection unit configured to detect the wavelength of an optical signal by using each of a plurality of optical detectors, determine the passage target optical switch based on a detection result, and output, to the determined passage target optical switch, a control signal for controlling the passage target optical switch so as to enter the passage state, the optical detectors being respectively provided on different paths that are different from the paths on which the plurality of optical switches are provided and that respectively correspond to wavelengths into which the optical signal is split by a wavelength multiplexer/demultiplexer.

7. An optical transmission method comprising:
a wavelength selection step of splitting an optical signal that is amplified by an optical amplifier into different paths according to wavelengths by using a wavelength multiplexer/demultiplexer, and controlling a passage state of a passage target optical switch through which the optical signal is to be passed, out of a plurality of optical switches provided on the respective paths, to select an optical signal of a path where the optical signal entered and output the optical signal to a receiver; and
a wavelength detection step of detecting the wavelength of an optical signal by using each of a plurality of optical detectors, determining the passage target optical switch based on a detection result, and outputting, to the determined passage target optical switch, a control signal for controlling the passage target optical switch so as to enter the passage state, the optical detectors being respectively provided on different paths that are different from the paths on which the plurality of optical switches are provided and that respectively correspond to wavelengths into which the optical signal is split by a wavelength multiplexer/demultiplexer.

* * * * *